United States Patent

[11] 3,577,581

| [72] | Inventor | Stanley S. Stata<br>Rockford, Ill. |
|---|---|---|
| [21] | Appl. No. | 842,605 |
| [22] | Filed | July 17, 1969 |
| [45] | Patented | May 4, 1971 |
| [73] | Assignee | Andrew F. Winterconn<br>Rockford, Ill.<br>fractional part interest to each |

[54] SHOE SCRAPER FLOOR GRATINGS FOR AUTOMOBILE FLOORS
13 Claims, 5 Drawing Figs.

[52] U.S. Cl. .................................................... 15/215, 296/1
[51] Int. Cl. .......................................................B62d 25/20, B60n 3/06
[50] Field of Search.......................................... 15/215, 217, 238, 237, 265, 161; 180/90.6; 296/1 (F); 52/177, 181, 182, 624

[56] References Cited
UNITED STATES PATENTS

| 2,680,698 | 6/1954 | Schnee.......................... | 15/215 |
| 3,387,315 | 6/1968 | Stata ............................ | 15/215 |
| 3,424,265 | 1/1969 | Stata ............................ | 296/1F |
| 3,390,912 | 7/1968 | Stata ............................ | 15/215 |

Primary Examiner—John E. Murtagh
Attorney—Andrew F. Wintercorn

ABSTRACT: This vehicle floor mat consists of a rigid frame secured to the floor, and a mat of flexible material including a pan having a shoe scraper means therein, whereby dirt and moisture scraped from shoes is retained in the pan, and interfitting portions on the marginal edge portions of the pan and in the frame providing for detachably securing the pan in the frame against displacement from its position on the carpet these portions being designed to have a snap fit. A front cross portion on the frame in one form underlies the junction of a toeboard extension with the pan so as to allow free drainage of moisture from the toeboard extension into the pan over this cross portion.

PATENTED MAY 4 1971  3,577,581
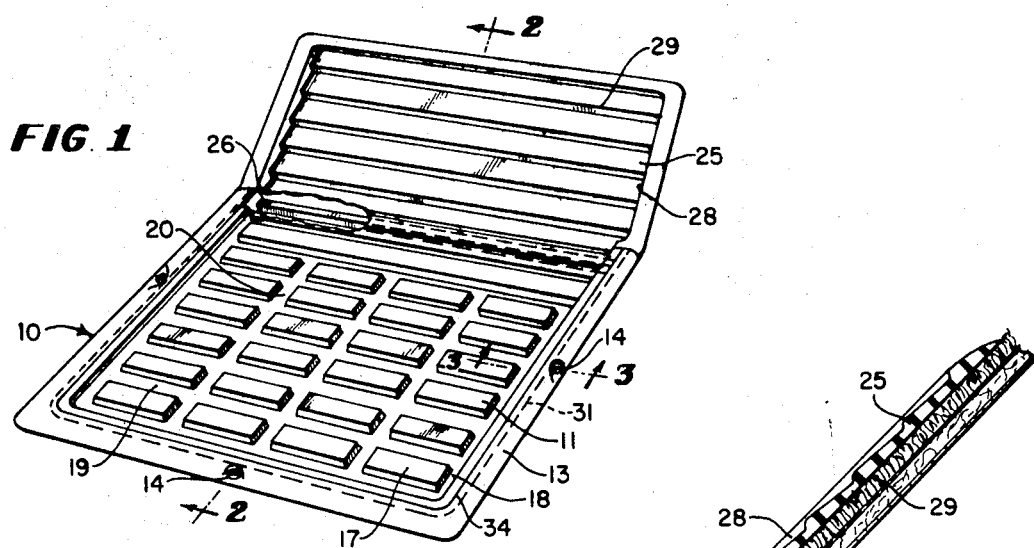
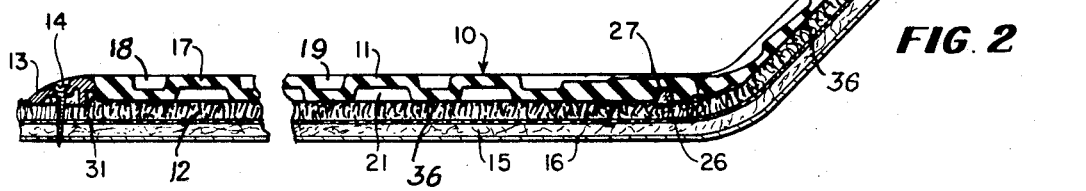
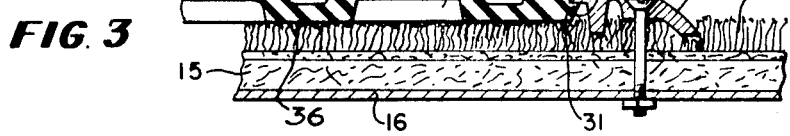
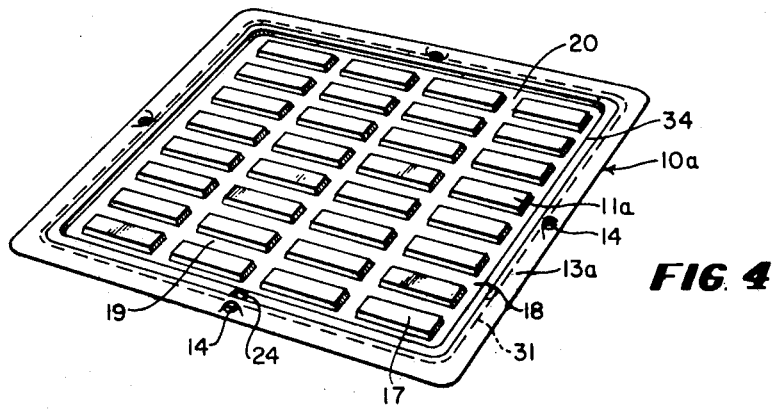
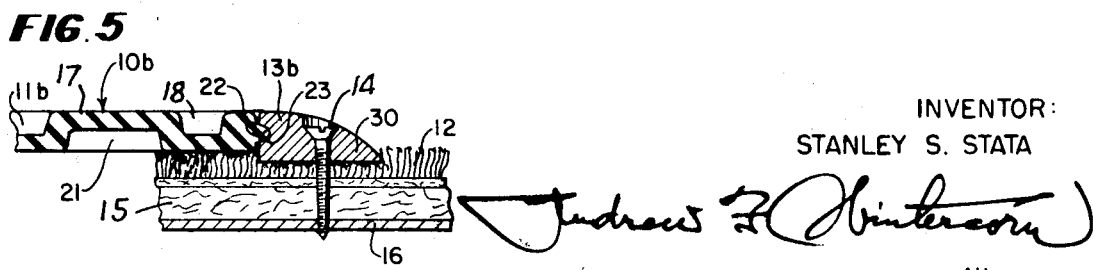
INVENTOR:
STANLEY S. STATA
Attorney

SHOE SCRAPER FLOOR GRATINGS FOR AUTOMOBILE FLOORS

This invention relates to shoe scraper floor gratings for application over the carpet on automobile floors.

The principal object of my invention is to provide shoe scraper floor grate pans of durable rubber or plastic material having spaced parallel scraping ribs formed integral with the bottom of a shallow generally rectangular pan, with recesses between the ribs deep enough to collect moisture and dirt in the anticipated amount, the moisture being retained during evaporation thereof while leaving the top surfaces of the ribs fairly dry, the pan being designed to rest on top of the carpet on the automobile floor and be detachably secured in place by means of a rigid generally rectangular bordering frame suitably secured in place, the front open portion of the frame, where, as in the case of front seat units, the pan includes a forwardly and upwardly extending inclined toeboard portion on the front end thereof resting on the carpet and draining freely into the main body portion of the pan, having a transversely extending reinforcing tie-bar rigidly connecting opposite sides of the frame and disposed in concealment under the pan at the junction with the toeboard extension and fitting closely in a groove in the under side of the pan, thereby helping also to fix the position of the pan and its extension. Removability of the pan is desirable as it enables thoroughly washing and drying the same at intervals for neater appearance.

In accordance with my invention longitudinally extending horizontal ribs or flanges provided on the margins of the pan are entered with a close fit in the frame to hold the pan securely against shifting, although it may be stripped from the frame by handling from the toeboard end. The flexibility and compressibility of the material of the pan, as well as its resilience, all play a part in the easy removal and replacement of the pan as well as insuring its retaining a set position after replacement.

In the preferred form, a horizontal flange on the frame has downwardly and inwardly inclined outer edges which are wedgingly engaged by matching inclined outer edges on a longitudinally extending horizontal rib provided on the margins of the pan so that the pan is adapted to be snapped into place under the flange on the frame by downward pressure on the pan at the edges, whereupon the correspondingly inclined outer edges of the pan above the longitudinally extending rib engage the inclined edges on the frame flange with a snug fit, with the pan lying substantially flush with the top of the frame for a neat and attractive appearance and for ease in sweeping dirt from the carpet over the frame and into the pan.

The invention is illustrated in the accompanying drawing, in which:

FIG. 1 is a perspective view of the floor grate unit for use in front of the front seat on either side made in accordance with my invention;

FIG. 2 is a cross section on the line 2—2 of FIG. 1;

FIG. 3 is a sectional detail on a larger scale taken on line 3—3 of FIG. 1;

FIG. 4 is a perspective view similar to FIG. 1 but showing a floor grate unit for use in front of either rear seat, and FIG. 5 is a sectional detail similar to FIG. 3 but showing an interfitting rib and groove construction.

Similar reference numerals are applied to corresponding parts throughout the views.

The floor grating units of my invention are indicated generally by the reference numerals 10, 10a and 10b, in FIGS. 1, 4 and 5, respectively. Each consists of a generally rectangular pan 11, 11a and 11b, respectively, made of rubber or suitable plastic material resting on the carpet 12 on the floor of the car and held in place by means of a rigid border frame 13, 13a and 13b, respectively, secured by sheet metal screws 14 or bolts 14' entered in holes provided in the frame at suitably spaced intervals, the screws extending through the carpet 12 and the jute sound deadener material 15 therebeneath and threading in holes pierced in the metal floor 16 of the automobile, as indicated in FIGS. 3 and 5. The pans all have spaced parallel scraping ribs 17 formed integral with the bottom of the pan, the ribs being substantially the full depth of the pan and ending short of the sides thereof to leave a deep annular recess 18 all around each pan communicating with the ends of the parallel recesses 19 provided between the ribs 17, whereby to provide enough space for the collection of the anticipated amount of moisture and dirt, the moisture being thus retained in the pan during evaporation while leaving the top surfaces of the ribs 17 fairly dry. Spaced fore and aft extending parallel recesses 20 intersect and connect recesses 19 to add further storage space for moisture. The pans can be easily cleared of dirt at intervals with a vacuum cleaner so that these floor gratings make for neatness and cleanliness in motor vehicles, besides enhancing the appearance of the car's interior and eliminating the unsightliness that results when the carpeting becomes worn at certain spots. Thus, cars with worn spots in the carpeting can have these covered up with these floor gratings and made to look like new. The thought, however, is to install these units in new cars and avoid the wearing out of the carpet in the usual places. To conserve in the cost of production and also make the units lighter weight, the ribs 17 which may be made solid, are preferably all made hollow as indicated at 21 in FIGS. 3 and 5. Each pan may, as shown on pan 11b in FIG. 5, have longitudinally extending flanges or ribs 22 on each side of the pan, and the border frames have longitudinally extending grooves 23 provided on the inner sides thereof to receive these ribs with a snap in fit for detachably securing each pan in its frame. A notch 24 may be provided as shown in FIG. 4 on at least one side of each pan, at the middle, wide enough to receive the end of a screwdriver or other prying tool for prying the pan out whenever it is desired to remove it for thoroughly washing and drying the same. In that way, unsightly smears of dirt that might not otherwise be so easily removed can be thoroughly cleaned off. The flexibility, compressibility, and resilience of the material employed in the pans are all important factors in making the present construction practical and feasible. The pan may have extra thickness of material around the notch 24 to avoid likelihood of any damage being done to the pan in prying it out.

Referring to FIGS. 1 and 2, the unit shown here may be used at both front seat locations now that accelerator pedals and brake pedals have been removed from the old locations on the toeboard and extend over and in spaced relation to the toeboard. The toeboard extension 25 is molded integral with the pan 11 and is generally rectangular in form and extends from the front end of the pan and is adapted to rest on the toeboard carpeting, there being a cross portion or tie-bar 26 extending transversely of the frame 13 at the lower end of this toeboard extension rigidly connecting the front end portions of the frame on opposite sides of said extension. A transverse groove 17 provided in the bottom of the pan 11 at the junction with the toeboard extension 25 closely receives this tie-bar and in that way the front end portion of the pan is anchored as well as the lower end portion of the toeboard extension while the tie-bar itself maintains the desired rigidity in the frame 13 despite the wide gap necessary in the frame at this front end portion for the toeboard extension. The bar 26 has an upward taper in cross section, as seen in FIG. 2, and the groove 27 is tapered to match so as to provide for wedging engagement between these interfitting parts for an even better anchorage of the pan and its toeboard extension. The latter has a generally rectangular recess 28 provided therein from which project a plurality of foot scraping ribs 29 in widely spaced parallel relation off which there is good drainage of moisture from the recess 28 into the pan 11.

The pan 11a shown in FIG. 4 is designed for use in units installed in front of the rear seat and, of course, has no toeboard extension. The construction is otherwise the same as the one shown in FIGS. 1 to 3.

The frames 13, 13a, and 13b may be of die-cast metal or molded of hard rubber, and, while I prefer the screw fastenings shown, I do not wish to limit the invention to that method of fastening inasmuch as I may provide the frames of less rigid plastic or rubber with a thin outer edge portion 30, as shown in FIG. 5, through which the frames could be fastened to the carpeting by sewing.

Referring to FIGS. 2 and 3, the pan 11 preferably has longitudinally extending ribs 31 of this snap fit construction in the plan of the lower half of the pan and these ribs have inwardly inclined outer edges 32 arranged to have wedging engagement with matching inclined edges 33 provided on the inside of longitudinally extending horizontal flanges 34 provided on the bordering frame 13. All that is required is light downward pressure with one foot on the top of the pan 11 at the edges to assemble the pan in the frame with a snap fit, the longitudinally extending rib 31 snapping into place under the flange 34, whereupon the inclined outer edges 35 of the pan come into engagement with the inclined edges 33 of the flanges 34 as shown in FIG. 3. In removing the pan 11 from the frame, it is best to lift the toeboard extension and especially free the front end of the pan from the crossbar and then use the front end as a means of pulling the pan out of the frame.

In the front seat units, there are spaced conical projections 36 on the bottom of the pan and toeboard extension to be impressed into the carpet on the floor and toeboard to help hold the pan and its extension in a set position and yet not interfere too much with the removal thereof when that is desired.

It is believed the foregoing description conveys a good understanding of the objects and advantages of may invention. While a preferred embodiment of the invention has been illustrated and described, this is only for the purpose of illustration, and it is to be understood that various modifications in structure will occur to a person skilled in this art.

I claim:

1. In a floor grating construction for vehicles, a substantially horizontal floor overlaid with carpeting of compressible material, a generally rectangular shallow pan of flexible material resting on the carpeting having an upwardly projecting rim portion on the marginal edges thereof inside which the moisture and dirt scraped off shoes is retained, shoe scraper grating means provided in said pan, a relatively rigid frame of generally rectangular form secured in a desired position on the carpet, and means comprising interfitting projections and recesses on the marginal edge portions of said pan and in said frame for detachably securing said pan in said frame against displacement from its position on the carpeting, the pan having a toeboard extension integral with the front end portion thereof flexible upwardly at an acute angle with respect to the substantially horizontal plane of said pan, the frame having a front cross portion underlying the junction of said pan and toeboard extension and extending the full width of said extension.

2. A floor grating construction as set forth in claim 1 wherein the shoe scraper grating means provided in said pan are in the form of integral ribs in spaced relation to one another and to the rim portion of said pan, whereby moisture collected in said pan is substantially uniformly distributed to facilitate evaporation thereof.

3. A floor grating construction as set forth in claim 1 wherein there are sharp downward projections on the bottom of the pan and toeboard extension for impression into the carpet to resist displacement of the pan from a set position in the frame.

4. A floor grating construction as set forth in claim 1 wherein the front cross portion of the frame underlying the junction of said pan and toeboard extension is entered in a groove provided therefor in said extension at said junction extending the full width of said extension.

5. In a floor grating construction for vehicles, a substantially horizontal floor overlaid with carpeting of compressible material, a generally rectangular shallow pan of flexible compressible material resting on the carpeting having an upwardly projecting rim portion on the marginal edges thereof inside which the moisture and dirt scraped off shoes is retained, shoe scraper grating means provided in said pan, a relatively rigid frame of generally rectangular form secured in a desired position on the carpet, means comprising interfitting projections and recesses on the marginal edge portions of said pan and in said frame for detachably securing said pan in said frame against displacement from its position on the carpeting, the pan having a toeboard extension integral with the front end portion thereof flexible upwardly at an acute angle with respect to the substantially horizontal plane of said pan, the frame having a front cross portion underlying the junction of said pan and toeboard extension and extending the full width of said extension, a marginal rim portion on said extension, and shoe scraper grating means provided on said extension within said rim portion.

6. A floor grating construction as set forth in claim 5 wherein the shoe scraper grating means provided on said toeboard extension comprises projections integral with said toeboard extension spaced with respect to one another within said rim on said toeboard extension, whereby to allow free drainage of moisture from said toeboard extension into said pan.

7. In a floor grating construction for vehicles, a substantially horizontal floor overlaid with carpeting of compressible material, a generally rectangular shallow pan of flexible material resting on the carpeting having an upwardly projecting rim portion on the marginal edges thereof inside which the moisture and dirt scraped off shoes is retained, shoe scraper grating means provided in said pan, a relatively rigid frame of generally rectangular form engaging the marginal edge portion of said pan to secure it in a desired position on the carpeting, and means for securing said frame against displacement from its selected position, the pan having a toeboard extension integral with the front end portion thereof flexible upwardly at an acute angle with respect to the substantially horizontal plane of said pan, said extension resting on a carpet covering on the toeboard, said pan and extension both having sharp downward projections thereon for impression into the carpet to resist displacement from a set position, the frame having a front cross portion underlying the junction of said pan and toeboard extension and entered in a groove provided therefor at said junction extending the full width of said extension.

8. In a floor grating construction for vehicles, a substantially horizontal floor overlaid with carpeting of compressible material, a generally rectangular shallow pan of flexible material resting on the carpeting having an upwardly projecting rim portion on the marginal edges thereof inside which the moisture and dirt scraped off shoes is retained, shoe scraper grating means provided in said pan, a relatively rigid frame of generally rectangular form secured in a desired position on the carpet, and means comprising longitudinally extending inwardly projecting flanges on said frame overlying longitudinally extending outwardly projecting rib portions on said pan for detachably securing said pan in said frame against displacement from its position on the carpet, the inner edges of said flanges being inclined outwardly and the outer edges of said rib portions on said pan having matching inclination and adapted for wedging engagement with the inclined inner edges of said flanges when assembling said pan in said frame, whereby some compression of the marginal portion of the pan occurs when downward pressure is applied to the marginal portion of the pan to force the rib portion downwardly past and under the flange with a snap fit.

9. A floor grating construction as set forth in claim 8, wherein said pan has the outer edges thereof above the outwardly projecting rim portion provided with correspondingly outwardly inclined edge portions which when the pan is retained in place under the flange on the frame has abutment with the outwardly inclined inner edge portions of the flange.

10. A floor grating construction as set forth in claim 8, wherein said pan has the outer edges thereof above the outwardly projecting rim portion provided with correspondingly outwardly inclined edge portions which when the pan is retained in place under the flange on the frame has abutment with the outwardly inclined inner edge portions of the flange, the top surface of the pan lying substantially flush with the top of the frame so that dirt swept off the carpet over the frame is easily swept into the pan.

11. A floor grating construction as set forth in claim 8, wherein there is a notch provided in at least one edge portion of the pan intermediate the ends thereof, adapted to receive a prying tool entered inside the frame to facilitate the removal of the pan from the frame.

12. In a floor grating construction for vehicles, a substantially horizontal floor overlaid with carpeting of compressible material, a generally rectangular shallow pan of flexible, compressible and resilient material resting on the carpeting having an upwardly projecting rim portion on the marginal edges thereof inside which the moisture and dirt scraped off shoes is retained, shoe scraper grating means provided in said pan, relatively rigid frame of generally rectangular form and of dimensions to fit closely around said pan and secured in a desired position on the carpet, and means comprising projections on the marginal edges of said pan adapted by compression of marginal portions of said pan to be entered in elongated recesses provided in said frame with a snap fit for detachably securing said pan in said frame against displacement from its position on the carpeting.

13. In a floor grating construction for vehicles, a substantially horizontal floor overlaid with carpeting of compressible material, a generally rectangular shallow pan of flexible, compressible and resilient material resting on the carpeting having an upwardly projecting rim portion on the marginal edges thereof inside which the moisture and dirt scraped off shoes is retained, shoe scraper grating means provided in said pan, a relatively rigid frame of generally rectangular form and of dimensions to fit closely around said pan and secured in a desired position on the carpet, and means comprising projections on the marginal edges of said pan adapted by compression of marginal portions of said pan to be entered in elongated recesses provided in said frame with a snap fit for detachably securing said pan in said frame against displacement from its position on the carpeting, there being a notch provided in at least one edge portion of the pan adjacent the projection on that edge portion to receive a prying tool inside the frame to facilitate flexing of the said edge portion of said pan facilitating removal of the pan from the frame.